(12) United States Patent
Alanis

(10) Patent No.: US 6,395,187 B1
(45) Date of Patent: *May 28, 2002

(54) HORIZONTAL SOLIDS RECYCLER

(76) Inventor: Noe Martinez Alanis, Allende S/N, Allende N.L. (MX)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,238

(22) Filed: Oct. 1, 1998

(51) Int. Cl.[7] ............................................. B01D 37/00
(52) U.S. Cl. .................... 210/758; 210/784; 210/805; 210/394; 210/403; 210/770; 100/37; 100/117; 100/127; 100/145; 119/447
(58) Field of Search ................................. 210/770, 394, 210/414, 415, 251, 758, 805, 403, 784; 119/444, 447; 100/37, 117, 145, 126, 127

(56) References Cited

U.S. PATENT DOCUMENTS

| | | | |
|---|---|---|---|
| 2,450,522 A | * 10/1948 | North | 210/394 |
| 3,875,319 A | * 4/1975 | Seckler et al. | 426/431 |
| 4,018,899 A | * 4/1977 | Seckler et al. | 426/55 |
| 4,266,473 A | 5/1981 | Hunt et al. | 100/117 |
| 4,279,197 A | 7/1981 | Hunt et al. | 100/117 |
| 4,397,230 A | 8/1983 | Hunt et al. | 100/45 |
| 4,518,498 A | * 5/1985 | Monteyne | 210/394 |
| 4,724,077 A | * 2/1988 | Uchiyama | 210/394 |
| 4,750,454 A | * 6/1988 | Santina et al. | 210/170 |
| 5,009,795 A | 4/1991 | Eichler | 210/744 |
| 5,205,930 A | 4/1993 | Obrestad | 210/251 |
| 5,628,912 A | * 5/1997 | Nesseth | 210/768 |
| 5,853,585 A | * 12/1998 | Nesseth | 210/394 |

* cited by examiner

Primary Examiner—Robert J. Popovics
(74) Attorney, Agent, or Firm—Abelman, Frayne & Schwab

(57) ABSTRACT

Horizontal solids recycler to treat waste water comprising refuse solids from hog farms which comprises an intake and loading hopper adapted to establish a uniform curtain of the waste water, a mesh to which an over flow of the waste water is directed, a tumbler cylinder to which is mounted the mesh and which is mounted to a frame which rests on guide wheels, blades mounted within te tumbler cylinder to raise moistured solids, wherein said waste water of said moistured solids is passed through a mesh, a collecting bin to collect the solids coming from the tumbler cylinder and raised by the blades which comprises a separator to separate the remaining waste water from the solids, a screw to transport the solids, which is mounted to the collecting bin, a pressing section which comprises a perforated cylinder to which the solids are fed by the screw, a collecting and recycling hopper to which said perforated cylinder is mounted to, and which said collecting and recycling hopper collects and recycles the waste water to the tumbler cylinder, a self adjusted dewatering cone to which the solids are pressed within the perforated cylinder by the screw to dry them, wherein said pressing section is mounted on a base provided with bearings and from which the dried solids are expelled to dried manure cellar and the separated waste water is recycled both to the farm or to the horizontal solids recycler.

4 Claims, 3 Drawing Sheets

HORIZONTAL SOLIDS RECYCLER

BACKGROUND OF THE INVENTION

This invention relates in general to the separation of heavier materials from a fluid mixture. More specifically it relates to the separation of heavier materials from a fluid discharge mixture from hog farms to reclaim the predigested grain from hogs to clean the farms, optimize the operation, lower the oxidation time of the remaining fluids and improve the environment around hog farms. Hog farms have many environmental problems because of the outcome refuse materials which are the main cause of contamination. Usually the refuse comprises the water used to clean the pigsties and wash the hogs. This waste water mainly contains the hogs manure and the farms dirtiness which can be classified in three portions, a liquid portion, a settling solids portion and a suspended solids portion.

Generally the refuse from hog farms is treated in oxidation pits to be used thereafter in the meadows as a fertilizer without the risk of polluting the environment. In the oxidation pits the settling solids portion can be separated by dredging of the bottom of the pit. The suspended solids portion may be removed by separators and finally the liquid portion may be used alone in the meadows for irrigation, or mixed with a portion of the dried settling portion coming from the bottom of the oxidation pit to fertilize the crops.

Other methods require collecting the refuse in large tanks to separate the solids from liquids and thereafter use the removed solids coming from the bottom of the tanks to be separated into wet and dry phases by means of pumps and separators. Unfortunately, these methods are slow and laborious and require many devices and mechanisms to operate.

Screw presses used in a number of industries have been used to separate solids from liquids and the prior art teaches some methods and features to accomplish this task. For example U.S. Pat. Nos. 4,279,197 and 4,266,473 are used to dejuice grapes for wine and juice industry. U.S. Pat. No. 4,397,230 is used to separate materials with high liquid and solids content wherein the solids have varied physical characteristics with a continuous motion through the press.

U.S. Pat. No. 5,009,795 proposes a process and apparatus to separate and dewater solids contained in waste waters in concentrations of less than about 10%, like the originated in animal intensive operations or in industrial processes for processing plants or animals or their parts, mixed with fibers like animal hairs or vegetable fibers. Solids contained in waste water are separated by means of a cylindrical strainer basket and a rotary screw disposed within said basket. Waste water introduced in the separator is advanced by the screw until a solids slug develops. The slug is pressed laterally against the wall of the basket to promote removal of water. A lever mounted barrier positioned outside of solids discharge is used as a discharge control.

A huge pressure is exerted on the lateral wails of the cylindrical strainer which may cause failure of the equipment, because is a closed system. This screw press is only capable of managing concentrations of manure of up to 10% because of the principle based on exerting pressure on lateral walls.

The actual invention operates with concentrations of up to 50% of solids and can be upgraded to more than 50%, because there is no lateral pressure exerted.

U.S. Pat. No. 5.205,930 relates to a method to separate natural manure or manure from domestic animals into a wet phase and a dry phase to obtain manurial matter easier to handle. The rotatable screw conveyor includes a first and a second screw thread sections. Between the first screw thread section and the second screw thread section there is a space or annular zone free of obstruction (thread) around the entire circumference of the shaft to allow the formation of a plug of manure which will exert a back pressure on the upstream portions of manure enhancing the separation of a wet and a dry portions. Finally the second screw thread portion removes portions of the formed plug to discharge the dry phase from the device.

This screw press is unable to control the passage of manure to the discharge socket, which has to be stored in a storage room or basin for what is called liquid manure. This is a drawback of the invention because the reclaimed water needs of strong treatments to separate the remaining solids.

Another drawback of the invention is the back pressure exerted by the manure plug formed between the first and second thread sections because this kind of plugs exerts pressure on the radial walls of the screw (cylinder mantle 5) which upon variations on the water content of the manure may disalign the screw or may brake the cylinder mantle because this is a closed system.

These known methods and devices to separate manure and solids from waste waters are complicated and require sophisticated equipment. The features and advantages of the present invention overcome all these problems.

SUMMARY OF THE INVENTION

According to the foregoing it is a principal object of the invention to provide an improved horizontal solids recycler which can handle waste water with hogs manure.

It is another object of the invention to provide an inlet and distribution casing to be used under normal very low pressure flow.

It is still another object of the present invention to provide a replaceable mesh to cover a tumbler cylinder to receive a waste water curtain containing the hogs manure.

It is yet another object of the present invention to provide a device with blades to rise the solids with some moisture to a loading hopper.

It is a further object of the present invention to provide an open dewatering system with an improved self adjustable dewatering cone which drains the separated waste water back to a channel.

The horizontal solids recycler of the present invention comprises an inlet to adapt the intake to any discharge outlet to admit the waste water discharge from the farm. The inlet can be adjusted to establish a uniform curtain of waste water to be distributed over a tumbler cylinder which comprises a highly durable replaceable mesh which is around the tumbler cylinder, and rising blades to rise the solids with some moisture to pass it to a collecting bin which comprises a separator which allows the waste water to flow while the solids are transported by a screw which takes the solids to press them against a self adjustable dewatering cone. The screw is mounted outside the tumbler cylinder, over the collating bin and open to air to allow the reclaimed waste water to fall to a waste water intake which can recycle the waste water to be reused in the horizontal solids recycler. The pressing section comprises a hollowed cylinder within which the solids are pressed by the screw against a self adjustable dewatering cone to separate the remaining waste water from the solids and to transport the solids to the discharge The solids discharge from the horizontal solids recycler can be used as a feedstock for cattle or mixed again with water as a fertilizer to be used in the meadows. These and other advantages of the invention will become apparent from the following detailed description of the invention and the accompanying drawings.

BRIEF DESCRIPTION OF THE DRAWINGS

The novel features and advantages of the present invention should be readily apparent for those skilled in the art arising from the teachings of the detailed description herein and the drawings but it should be understood that the instant invention can be embodied in different ways and that the embodiments herein described are shown for illustration purposes only, but that they are not restrictive as referred to the scope of the invention wherein.

DETAILED DESCRIPTION OF THE INVENTION

Figure 1:
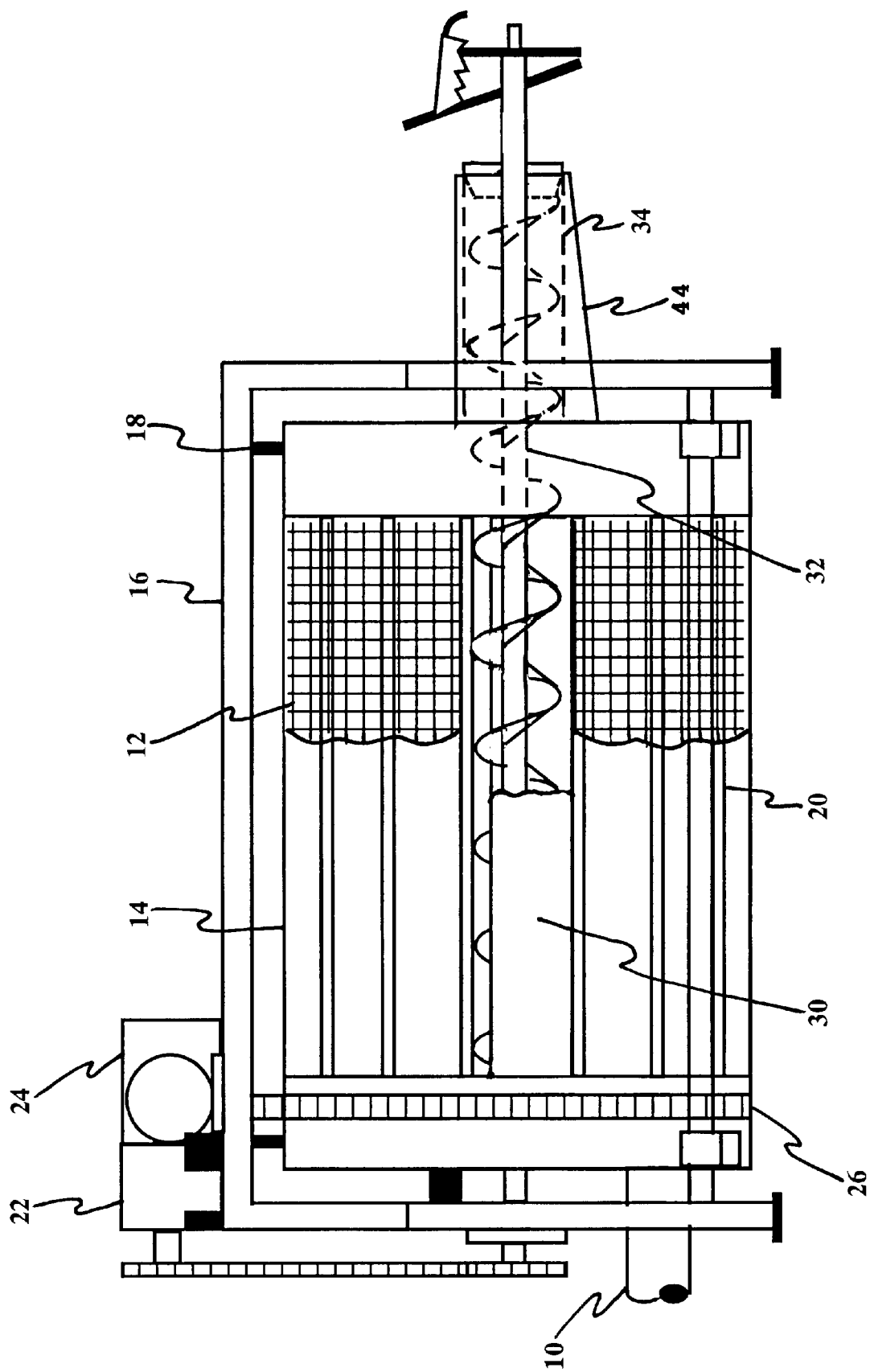
FIG. 1 is a lateral view of the horizontal solids recycler.

With reference to FIG. 1, numeral 10 generally represents an intake to the horizontal solids recycler and which is adapted to establish a uniform curtain of waste water flowing over a highly durable replaceable mesh 12 mounted to a tumbler cylinder 14 mounted to a frame 16 which rests on guide wheels 18. The tumbler cylinder 14 comprises blades 20 which turn by the action of a speed reducer 22 with two outlets and star transmission 24, and chain 26 with star adjusting not shown. The tumbler cylinder 14 makes the waste water to pass through the mesh 12 and the solids raised by the blades 20 to a collecting bin 30 which comprises a separator (not shown) which separates the waste water from the solids. The waste water falls from the tumbler cylinder 14 and is sent to an oxidation pit for further treatment. The solids are transported by a screw 32 which is mounted over the collecting bin 30 Thereafter the solids are fed to a perforated cylinder 34 mounted in a pressing section of the horizontal solids recycler.

Figure 2:
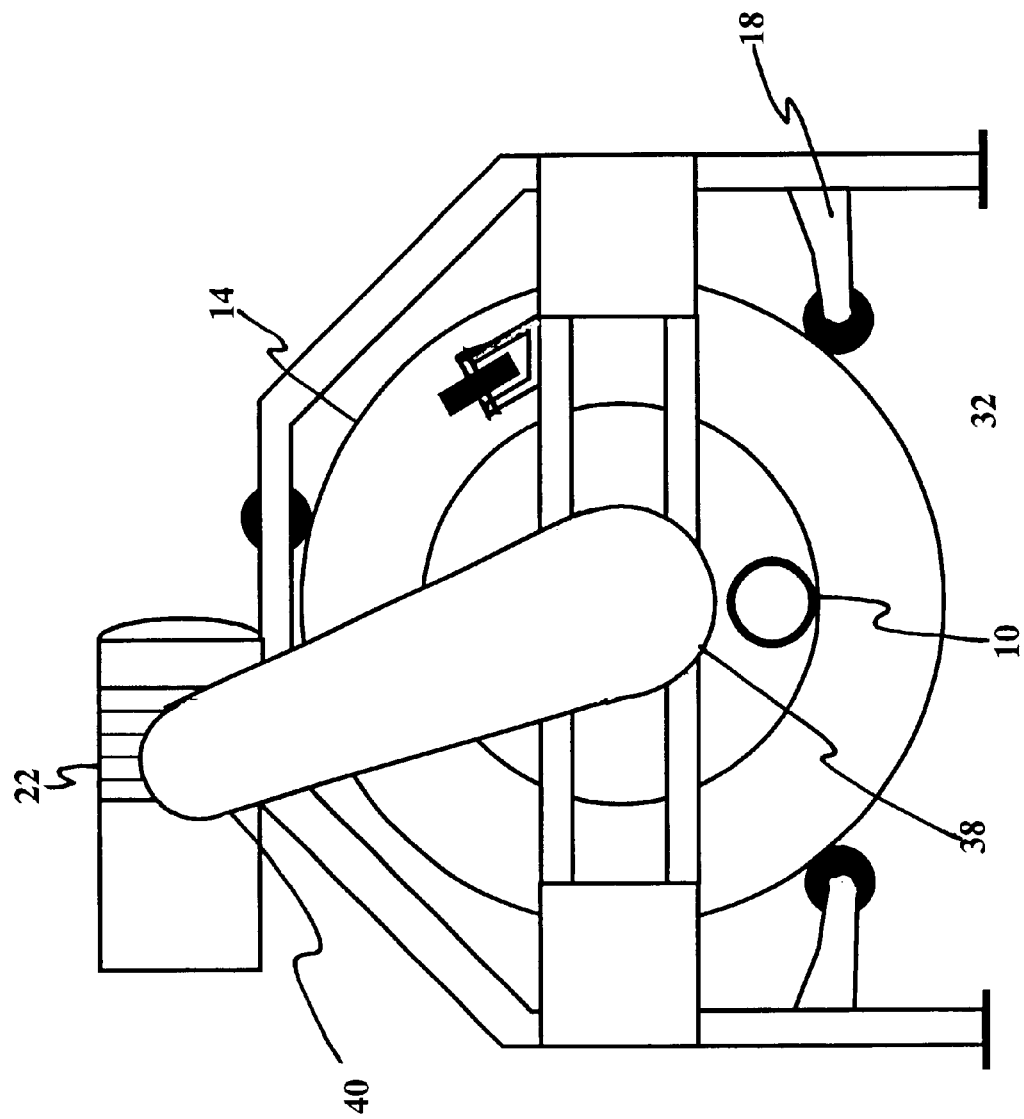
FIG. 2 is an elevation of the horizontal solids recycler showing the intake.

Relating to FIG. 2, it can be seen the transmission of the screw 32 comprising a speed reducer 22, stars 38 and 40 and the guide wheels 18 on which the tumbler cylinder 14 rests.

Figure 3:
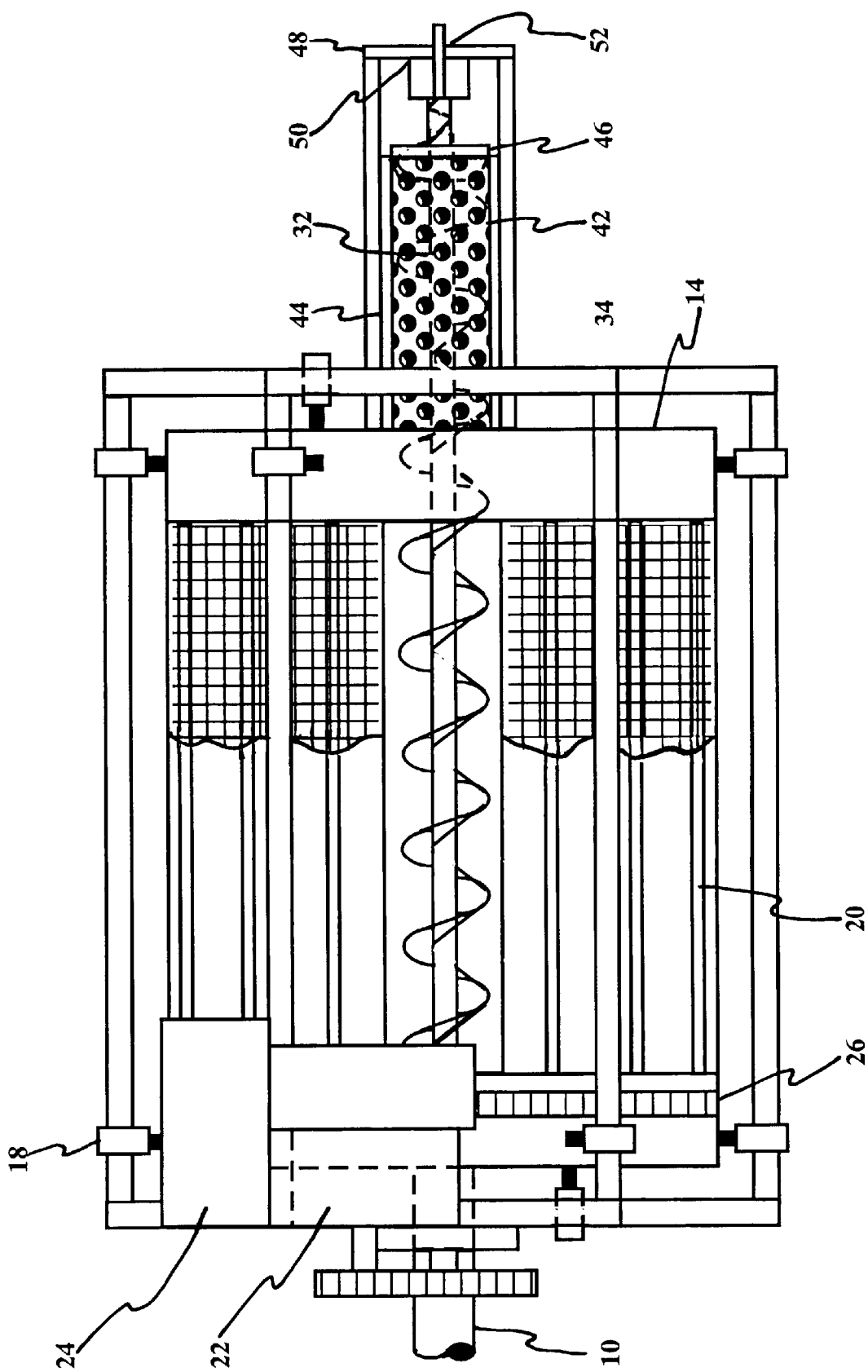
FIG. 3 is a front view showing the pressing section.

In FIG. 3 it can be seen the pressing section of the horizontal solids recycler, which comprises a hollowed cylinder 42 which is mounted in a collecting and recycling hopper 44 which collects and recycles the waste water to the nimbler cylinder 14 and wherein said screw 32 press the solids against a self adjustable dewatering cone 46 which upon pressure is displaced outwardly in axial direction to expel the dried solids. The pressing section is mounted on a base 48 provided with bearings 50 and 52. Pressing section is open to air to ease the pressing operation avoiding a counter pressure by the system. The water recovered from the solids is returned back to the tumbler cylinder 14 to be recycled to the process.

The horizontal solids recycler is very easy to operate and once it is started it runs alone without the need of any operator because the operation is fully automatic.

From the foregoing description it should be appreciated that multiple changes can be made to the horizontal solids recycler and that the description and the embodiments of the invention are used herein for illustration purposes but are not limitative and that these modifications are within the scope and spirit of the invention.

What I claims is:

1. A process to separate solids from waste water containing hog manure in a horizontal solids recycler, which comprises:

feeding a low pressure waste water flow comprising refuse solids from hog farms having a concentration of about 50% by weight of solids to an inlet; establishing a uniform curtain of waste water over a tumbler comprising a mesh; passing the waste water through the mesh;

raising the refuse solids by means of rising blades in the tumbler; passing the refuse solids to a collecting bin; separating the waste water from the refuse solids in the collecting bin;

transporting the refuse solids by a continuous and uninterrupted thread; feeding the refuse solids to a perforated cylinder in a pressing section by means of the uninterrupted thread; pressing the refuse solids in the pressing section which is open to the air; collecting the waste water of the pressing section and recycling the waste water to the tumbler; drying the refuse solids by a self adjusting dewatering cone against which the refuse solids are pressed; expelling the dried refuse solids to a dried manure cellar; and recycling the separated waste water both to the farm and to the number of the horizontal solids recycler.

2. The process to separate solids from hog manure as claimed in claim 1, wherein said low pressure waste water flow is fed to a replaceable mesh.

3. The process to separate solids from hog manure as claimed in claim 1, wherein said waste water passed through the mesh is sent to an oxidation treatment.

4. The process to separate solids from hog manure as claimed in claim 1, wherein said waste water is separated by means of a perforated plate.

* * * * *